March 10, 1925.

K. BERGER 1,528,966

BRAKE MECHANISM

Filed April 26, 1924

INVENTOR
Knute Berger
BY
Frank Warren
ATTORNEY

Patented Mar. 10, 1925.

1,528,966

UNITED STATES PATENT OFFICE.

KNUTE BERGER, OF SEATTLE, WASHINGTON, ASSIGNOR TO WASHINGTON IRON WORKS, OF SEATTLE, WASHINGTON.

BRAKE MECHANISM.

Application filed April 26, 1924. Serial No. 709,130.

*To all whom it may concern:*

Be it known that I, KNUTE BERGER, a citizen of the United States, residing at Seattle, in the county of King and State of Washington, have invented a certain new and useful Improvement in Brake Mechanism, of which the following is a specification.

My invention relates to improvements in brake mechanism of the type in which a brake band is arranged to be tightened about a cylindrical drum and the object of my invention is to provide a simple and efficient brake actuating mechanism that is adapted to be controlled by air pressure thus affording a very efficient, quick acting and easily handled means for applying mechanical power to set or release the brake.

Another object is to provide a brake operating mechanism of the pneumatic type in which the brake band is applied or tightened on a drum by the force of a spring and released by the pressure of air and to further provide an especially simple and efficient arrangement of levers for communicating the force exerted by the air to the brake band.

Other and more specific objects will be apparent from the following description taken in connection with the drawings.

I accomplish these objects by devices illustrated in the accompanying drawings, wherein—

Figure 1:
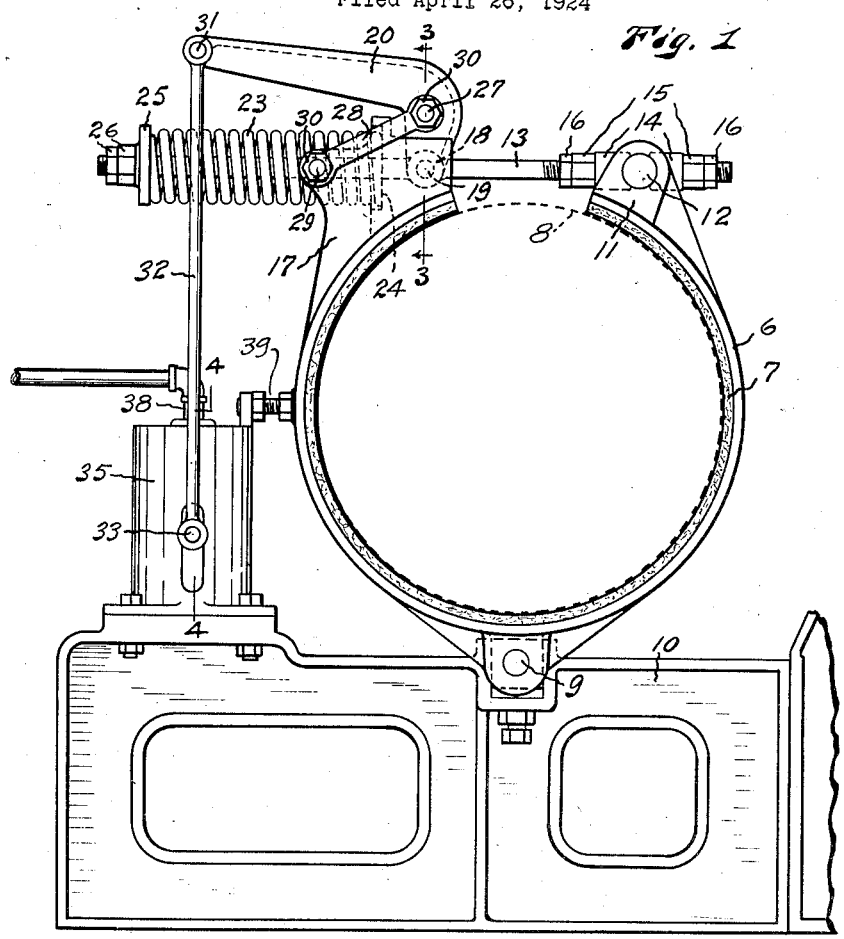
Figure 1 is a view in side elevation of a brake mechanism constructed in accordance with my invention showing the same mounted on a conventional support and indicating a brake drum by broken lines.

Referring to the drawings throughout which like reference numerals indicate like parts, 6 designates a brake band, of resilient metal, having a brake lining 7 adapted to frictionally engage a brake drum 8, indicated conventionally in Fig. 1 by dotted lines. The brake band 6 may be secured by a pivot 9 to a support 10, the pivot 9 being substantially diametrically opposite to the two ends of the brake band 6.

One end of the brake band 6 is provided with outwardly projecting rigid spaced lugs 11 through which a transverse pin 12 extends. A brake operating rod 13 extends through the pin 12 and is provided on each side of the pin 12 with a specially shaped washer 14 and two lock nuts 15 and 16.

Figures 3, 4:
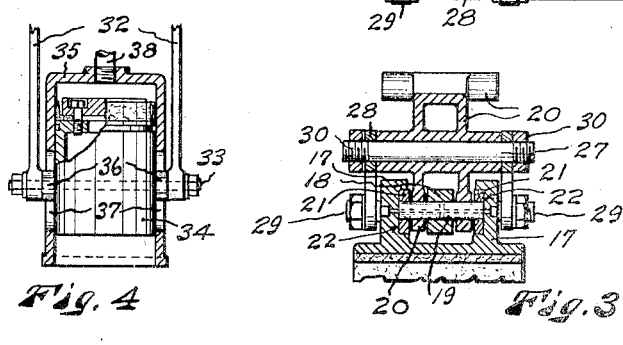
Fig. 3 is a fragmentary sectional view on broken line 3, 3 of Fig. 1.
Fig. 4 is a fragmentary sectional view of the air cylinder taken on broken line 4, 4 of Fig. 1, parts being shown in elevation.

The brake operating rod 13 extends through a bracket member 17 that is rigid with the other end of the brake band and said rod 13 is provided within said bracket member 17 with an enlarged portion 18 through which extends a transverse pin 19, as shown in Fig. 3. The pin 19 passes through the bifurcated end of the shorter arm of a bell crank lever 20 and the ends of the pin 19 are positioned within the relatively thin blocks 21 of rectangular or square-shape that are slidably disposed within grooves 22 in the spaced sides of the bracket member 17.

A compression spring 23 is provided on that portion of the brake operating rod 13 that projects outwardly from the bracket 17, the inner end of the spring 23 abutting against a seat 24 formed in bracket 17 and the outer end of said spring 23 abutting against a washer 25 that is adjustably supported on the outer end of the rod 13 by two lock nuts 26, the spring 23 operating in a well known manner to exert a pull through the lugs 11 on the end of the brake bank 6 and a pressure through the bracket 17 on the other end of the brake band to tighten said brake band on the drum 8.

Figure 2:
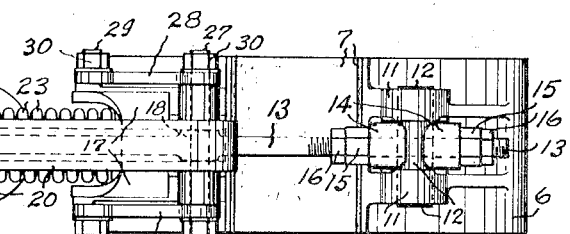
Fig. 2 is a plan view of the same, the support being omitted.

The bell crank lever 20 is connected by a pivot 27 with two fulcrum links 28 that are connected by pivots 29 with the bracket member 17, as shown in Figs. 1, 2 and 3. Nuts 30 are provided on pivots 27 and 29 to hold the links 28.

The outer end of the bell crank lever 20 is connected by pivots 31 with the ends of rods 32 whose other ends are connected by bolts 33 with a piston 34 that is reciprocably disposed in a cylinder 35 that may be mounted on the support 10.

Guide members 36, preferably in the form of discs flattened on two diametrically opposite sides, are provided between the piston 34 and the bottom ends of the rods 32 and are movable in slots 37 whereby they may serve as stop members to limit the movement of the piston in both directions. An air inlet and exhaust pipe 38 is connected with the top of the cylinder 35 so that air pressure may be admitted to and permitted to escape from the upper end of said cylinder to depress the piston 34 or to permit the same to move upwardly.

An anchor bolt 39 preferably connects one side of the brake band 6 with the top end of the cylinder 35 to further brace and strengthen the brake band.

In operation the spring 23 will always tend to tighten the brake band 6 around the drum 8 thus always tending to keep the brake set. When air under pressure is admitted to the cylinder 35 above the piston 34 it will tend to move said piston downwardly thus exerting a pull through links 32 on the outer end of the lever 20 and causing the shorter end of the lever 20 to exert a force on the operating rod 13 that opposes the force exerted by the spring 23 and tends to loosen the brake band 6. The force exerted in opposition to the tension of the spring 23 is proportional to the pressure admitted to the cylinder 35 thus making it possible by governing the pressure of the air to relieve the tension of the brake band to any desired extent or to entirely release said brake band from engagement with the brake drum 8.

The bell crank lever 20 together with its associate parts increases or multiplies the force exerted by the air pressure several times as will be apparent by referring to Fig. 1.

The links 28 form a floating fulcrum for the lever 20 and the lower end of the short arm of said lever is guided for movement lengthwise in bracket 17 by blocks 21 that are slidable in grooves 22 thus permitting free movement of said lever and at the same time always supporting said lever 20 in the proper position.

It will be obvious that when the lever 20 is moved upwardly the links 28, which are pivotally attached to the lever 20 and the bracket 17, will cause the guide means carrying the rod 13 to move outwardly thereby forcing the outer end of the band 6 away from the drum 7 and will cause the bracket 17 together with the other end of the band 6 to move away from the drum 7 which operation also releases the pressure of the spring 23 from the rod 13.

The pressure of the air that is admitted to the cylinder 35 can be very accurately controlled thus providing very accurate and flexible means for controlling the tension of the brake band.

The foregoing description and accompanying drawings clearly disclose a preferred embodiment of my invention, but, it will be understood that this disclosure is merely illustrative and that such changes in the construction of the device may be resorted to as are within the scope and spirit of the invention.

What I claim is:

1. The combination with a brake band operable on a brake drum, of a brake operating rod connected with one end of said brake band, bracket means on the other end of said brake band serving as a guide for said rod, a spring arranged to exert a tension on said rod, a lever connected with said rod, means pivotally connecting said lever and said bracket means, and means for operating said lever.

2. The combination with a brake band that extends around a brake drum and terminating in two adjacent ends, of a bracket mounted on one end of said brake band, guide means disposed in said bracket means, a rod attached to said guide means and pivotally connected to the other end of said band, a spring arranged to exert a tension on said rod, a lever pivotally connected with said guide means, means pivotally connecting said lever and said bracket, and means for operating said lever.

In witness whereof I hereunto subscribe my name this 15th day of April A. D. 1924.

KNUTE BERGER.